(12) United States Patent
Schwarz

(10) Patent No.: US 6,259,343 B1
(45) Date of Patent: *Jul. 10, 2001

(54) HIGH-GRADE PLASTIC COMPONENT

(75) Inventor: Manfred Schwarz, Wippenfürth (DE)

(73) Assignee: Max Baermann GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,043

(22) Filed: Aug. 2, 1999

(30) Foreign Application Priority Data

Aug. 12, 1998 (DE) ............................... 198 36 451

(51) Int. Cl.$^7$ ........................................ H01F 7/02
(52) U.S. Cl. ........................................ 335/302; 335/306
(58) Field of Search ........................... 335/302–306

(56) References Cited

U.S. PATENT DOCUMENTS

| 5,481,418 | * | 1/1996 | Maikuma et al. ............ 360/85 |
| 5,530,344 | | 6/1996 | Caillaut et al. . |
| 5,565,721 | * | 10/1996 | Knappe ....................... 310/68 |
| 5,760,521 | * | 6/1998 | Ushiro ........................ 310/268 |
| 5,969,844 | * | 10/1999 | Itami et al. .................. 359/198 |

FOREIGN PATENT DOCUMENTS

| 704000 | 2/1941 | (DE) . |
| 966 719 | 8/1957 | (DE) . |
| 1 043 540 | 11/1958 | (DE) . |
| 1614183 | 8/1967 | (DE) . |
| G 86 14 601.7 | 9/1986 | (DE) . |
| DE 3636039 A1 | 4/1988 | (DE) . |
| G 92 16 750 | 5/1994 | (DE) . |
| DE 196 25 478 A1 | 12/1997 | (DE) . |

* cited by examiner

Primary Examiner—Lincoln Donovan
(74) Attorney, Agent, or Firm—Nixon & Vanderhye P.C.

(57) ABSTRACT

With a high-grade plastic component, e.g. a plastic-bonded permanent magnet (1; 2), which is fixed to a basic body (4; 5), the basic body (4; 5) shows at least one strap-shaped part (7; 8) for the purpose of fixing it to the plastic component. In order to avoid the plastic component (1; 2) tearing off the basic body (4; 5), the strap-shaped part (7; 8) is surrounded with the high-grade plastic during manufacture of the plastic component and is arranged in the high-grade plastic in such a way that it can take up contraction strains of the high-grade plastic after manufacture of the plastic component at least partly by bending.

10 Claims, 1 Drawing Sheet

HIGH-GRADE PLASTIC COMPONENT

Figure 1:
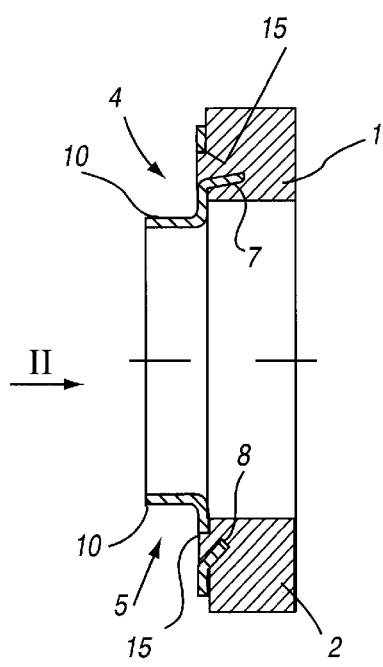

The invention relates to a high-grade plastic component, e.g. a permanent magnet, which is fixed to a basic body with the basic body showing at least one strap-shaped part for the purpose of fixing the plastic component.

With high-grade plastic components, it is a matter of parts with a material embedded in a plastic matrix. As embedding material, permanent magnetic particles for the manufacture of a plastic-bonded permanent magnet, soft magnetic particles the magnetic properties of which are determined by the surrounding electromagnetic fields, ceramic powder—e.g. for the manufacture of sealing washers—as well as other powder or particle shaped materials can be considered. High-grade plastic components of such kind are mostly manufactured through injection moulding with the plastic component being fixed to the basic body either by injection or after its manufacture by frictional connection or glueing. In many cases, the fixing is subject to particular safety requirements which exclude the application of frictional connection or glueing.

With positive connections, in particular when the plastic part is injected to the basic body, contraction strains occur with the cooling of the high-grade plastic which may result in the plastic part tearing off the basic body in the connecting area.

This problem, for instance, occurs with plastic-bonded permanent magnets which need to be fixed to a shaft as motor or sensor magnets. For this purpose, the basic body, to which the plastic-bonded permanent magnet is fixed, is placed on the captioned shaft by press fitting. The permanent magnets are applied as motor or sensor magnets and mostly laid out as ring or disk magnets which are fixed to a ring- or bush-shaped basic body.

Such plastic-bonded permanent magnets are increasingly applied in many technical fields. The automobile industry, for instance, is changing support functions like e.g. power steering for energy saving reasons from hydraulic to electromotive mode. The fixing of the sensor magnets to the captioned shaft, e.g. the steering wheel column, is subject to particular safety requirements. Accordingly, the technical surveyance associations require a frictional or positive connection as glued connections do not guarantee a permanent safe fixing.

From DE-PS 704 000, a permanent magnet is known which is fixed to a basic body by means of bended straps, possibly compensating measure tolerances of the permanent magnet towards the basic body.

If such a permanent magnet is laid out as a high-grade plastic component, the aforementioned problems will occur. I.e. during cooling of a thermoplastic bonded magnetic material a contraction occurs which may make up e.g. 5% of the volume. Due to the related contraction strains, the magnet may tear off the basic body.

The U.S. Pat. No. 5,530,344 discloses an encoder for a ball bearing which cooperates with a sensor for the purpose of determining the rotary speed of the bearing. This is performed by means of a axially magnetized dipolar ring which is equipped with radially running projections evenly distributed along the circumference. The permanent magnet is held by a ring disk-shaped basic body with window-like recesses taking up the projections. In addition, the permanent magnet is fixed to the basic body by means of a sealing device.

From DE-PS 966 719, a permanent magnet is known, particularly for bicycle dynamos, which is connected to a shaft by a separate operating cycle. For this purpose, a space between the permanent magnet and the shaft is moulded with metal. The central boring of the permanent magnet shows indentations at one or both ends which are filled by flanges building up when moulding with metal thus forming a safety device against shifting in lengthwise direction of the shaft.

In DE-AS 1 043 540, a permanent magnet is described which consists of a porous material and shows in its boring a bush made of non-sintered ceramic material which is fixed by means of synthetic resin cement. The bush is fixed to a shaft with ethoxylene resin cement. In this case too the permanent magnet, bush and shaft are connected to each other in separate operating cycles.

In DE-OS 1 614 183, a plastic-bonded hollow cylinder-shaped permanent magnet is described which shows a longitudinal slot as elastic fixing out of and/or in a hollow cylinder-shaped basic body. Here as well the connection between the permanent magnet and the basic body is done in a separate operating cycle. The permanent magnet is not fixed to the basic body and accordingly can tear off the basic body.

The DE 92 16 750 U1 discloses a rotor magnet of plastic-bonded magnetic material with an injected bush-shaped basic body. In order to reduce the strains occurring when the rotor magnet is pressed onto a shaft, the basic body shows a constriction in the center area of its outside circumference.

With the designs described above, permanent magnets made of plastic-bonded magnetic material show the problem of tearing off the basic body due to the contraction strains which occur during cooling.

As was mentioned before, this problem applies to the positive connection between a high-grade plastic component and a basic body in general.

Therefore, the invention is based on the task to create a tearproof positive connection between the permanent magnet and the basic body.

The task is solved as per the invention by arranging the strap-shaped part, which is surrounded by the high-grade plastic during manufacture of the plastic component, within the high-grade plastic in such a way that the contraction strains of the high-grade plastic occurring after the manufacture of the plastic component are at least partly taken up by bending.

Due to the measure as per invention, contraction strains occurring during cooling in the high-grade plastic surrounding the strap-shaped parts are completely or at least partly eliminated to such an extent that the plastic component a tearing off the basic body is avoided. In particular in such case, when the high-grade plastic component is a matter of a motor magnet or sensor magnet. The plastic component is preferably laid out as ring or disk magnet with the basic body showing a bush-shaped part for being fixed to a shaft and a flange part extending to the outside. The strap-shaped part/s are arranged in such a way that they incline towards the lengthwise direction of the basic body. Due to such arrangement of the strap-shaped part/s, contraction strains of the plastic-bonded magnetic material are taken up by bending these parts.

Advisably, several strap-shaped parts are provided and preferably distributed evenly along the circumference of the flange part.

In a preferred further development of the invention, the flange part consists of an approximately radially running ring-shaped area adjoining the bush-shaped part which shows openings distributed along the circumference at the radially inside or outside located edges of which the strap-shaped parts are arranged. Advisably, the openings are filled with the high-grade plastic, thus improving the positive connection of the plastic component to the basic body. During cooling, contraction strains occur in the area of the openings towards the outside volume of the high-grade plastic which, however, are taken up by the bendable straps and consequently are compensated.

In another version, the flange part adjoining the bush-shaped part shows a mainly radially running ring-shaped area where the strap-shaped parts are distributed along the circumference.

Starting from the ring-shaped area, the strap-shaped parts incline towards the lengthwise direction of the basic body in radial arrangement with recesses in between.

The openings and/or recesses guarantee the torsional strength of the plastic component on the basic body. Further, the openings surrounded by the ring-shaped area present a better guard against radial forces. The axial fixing strength is guaranteed by means of the radially running ring-shaped area and the connecting strap-shaped parts extending radially in a component, too.

With the aforementioned version, the strap-shaped parts may also adjoin directly the bush-shaped part of the basic body, i.e. without intermediate arrangement of the ring-shaped part.

In case of a bush-shaped basic body with a ring-shaped area of the flange part, the permanent magnet should preferably be located at the front of the ring-shaped area where the strap-shaped parts project in such a way that they incline towards the lengthwise direction of the basic body.

Although the invention is particularly suited for fixing ring- or disk-shaped plastic components, like e.g. plastic-bonded permanent magnets, to an appropriate basic body laid out in a bush shape, it can be applied with any high-grade plastic components of the kind as mentioned above which are fixed to a basic body.

With plastic-bonded permanent magnets, it can be the case of isotropic or anisotropic magnets. Such magnets can show thermoplastic or duroplastic plastics as a binder for the embedded permanent magnetic particles.

The basic body can be laid out as one piece. Preferably, it consists of metal or plastic with the composition and thickness of the material allowing the taking up of contraction strains, which occur during cooling of the magnetic material, at least in the area of the strap-shaped parts by bending.

The basic body can be manufactured as punching-bending part, rotating part or in jointing technique.

Figure 2:
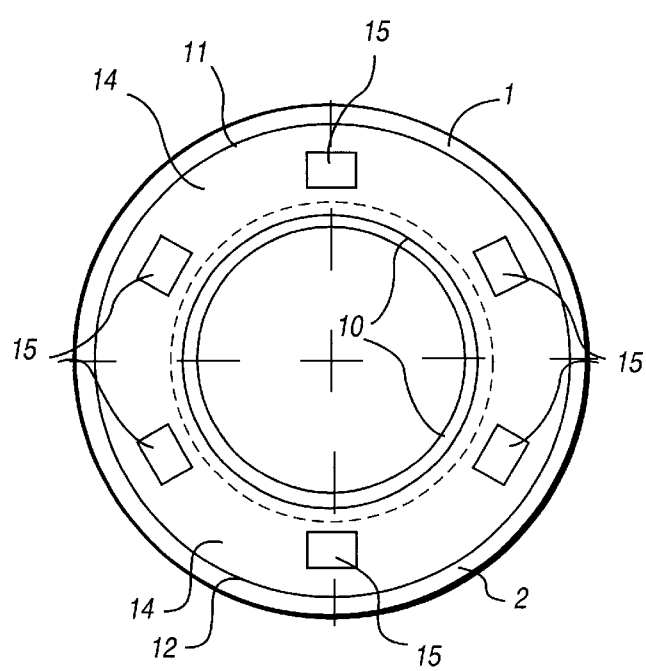
Figure 3:
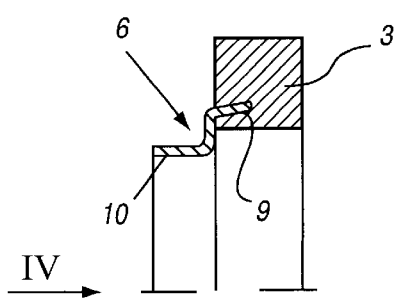
Figure 4:
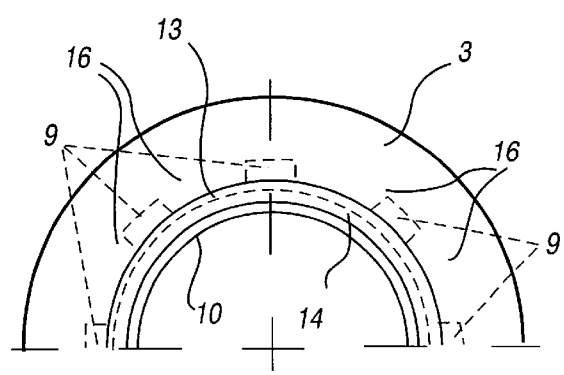

Preferred design examples of the invention are further specified and explained as per the following drawing:

FIG. 1 A cross section at the upper and lower half of a design example,

FIG. 2 A front view of the design examples shown in FIG. 1 into the direction of arrow II, FIG. 3 A cross section of a third design example showing only the upper half of the symmetry, FIG. 4 A front view of the design example shown in FIG. 3 into the direction of arrow IV.

As can be seen from the drawing, a plastic-bonded permanent magnet 1, 2 and/or 3 is connected to a basic body 4, 5, and/or 6 to which the permanent magnet is fixable by a movable basic part (not shown in the drawing). The basic body 4, 5 and/or 6 shows several strap-shaped parts 7, 8 and/or 9 which are injection-moulded with the plastic-bonded magnetic material and securely hold the permanent magnet during the motion of the basic part.

As is further specified and explained in the following with the design examples, the strap-shaped parts 7, 8 and/or 9 of the basic body 4, 5 and/or 6 are arranged in such a way in the plastic-bonded magnetic material that they take up at least partly the contraction strain of the plastic-bonded magnetic material during its cooling after the injection-moulding process by bending.

The permanent magnets 1, 2 and/or 3 shown in the design examples are laid out as ring magnets with the basic body 4, 5 and/or 6 showing a bush-shaped part 10 for the purpose of fixing it to a shaft. The ring magnet is located at the front of the bush-shaped part 10. The inside diameter of the bush-shaped part 10 is smaller than the inside diameter of the ring magnet in order that no strains can be transferred to the ring magnet when fixing the bush-shaped part to a shaft, e.g. by press fit.

The bush-shaped part 10 of the basic body 4, 5 and/or 6, is adjoining a flange part 11, 12 and/or 13 at the front facing the ring magnet extending to the outside and showing the strap-shaped parts 7, 8 and/or 9. The strap-shaped parts 7, 8 and/or 9 are arranged in such a way that they project into the ring magnet in lengthwise direction of the basic body 4, 5 and/or 6. Due to this arrangement, the contraction strains which occur during cooling of the plastic-bonded magnetic material and are mainly directed radially to the inside, are taken up by the strap-shaped parts 7, 8 and/or 9 by bending into the direction of the contraction strains, thus avoiding the magnet tearing off in the area of the strap-shaped parts.

With the design examples as shown in FIGS. 1 and 2, the flange part 11 and/or 12 adjoins the bush-shaped part 10 and consists of a radially running ring-shaped area 14 showing openings which are evenly distributed along the circumference. The openings are produced by means of punching the strap-shaped parts 7 and/or 8 which are, however, connected with one edge to the ring-shaped part 14 and by bending the strap-shaped parts at this edge into the direction pointing away from the bush-shaped part 10.

The openings 15 and/or the strap-shaped parts 7, 8 and/or 9 are mainly rectangular and oriented in the respective relative position.

With the design example shown in the upper half of FIGS. 1 and 2, the strap-shaped parts 7 are connected to the ring-shaped area 14 at the radially inside located edges of the openings 15 and are bended at these edges. The contraction strains occurring during cooling of the plastic-bonded magnetic material lead to a further bending of the strap-shaped parts 7 into their original bending direction.

With the design example shown in the lower half of FIGS. 1 and 2, the strap-shaped parts 8 are connected to the ring-shaped area 14 at the radially outside located edges of the openings 15. Due to the contraction strains occurring during cooling of the plastic-bonded magnetic material, the strap-shaped parts 8 are bended away from their original bending direction.

With both cases under consideration, different bending resistances of the strap-shaped parts 7 and/or 8 may occur, dependent of the material and thickness of the basic body 4 and/or 5, which can be adjusted to the required taking up of the contraction strains of the plastic-bonded magnetic material.

As can be seen on FIG. 1, the openings 15 are filled with plastic-bonded magnetic material. Without the bended strap-shaped parts 7 and/or 8 adjoining the basic body 4 and/or 5 in lengthwise direction, the contraction strains occurring during cooling of the plastic-bonded magnetic material could lead to the magnetic body tearing off at the openings. The strap-shaped parts 7 and/or 8 as well as the openings 15 guarantee an optimum hold of the permanent magnet 1 and/or 2 against axial and radial shifting as well as torsion on the basic body 4 and/or 5, with a likewise optimum guarantee against the magnet body tearing off in the area of this fixings being fulfilled.

With the design example shown in FIGS. 3 and 4, the flange part 13 adjoins the bush-shaped part 10 and shows a radially running ring-shaped area 14 with the strap-shaped parts 9 being arranged along the circumference. The strap-shaped parts extend in such a way that they incline towards the lengthwise direction of the basic body 6 away from the bush-shaped part 10 into the magnet body. The strap-shaped parts 9 as well are mainly laid out rectangular and oriented in the respective relative position. Between the strap-shaped parts 9, the flange part 13 shows larger recesses 16 which extend along the circumference and are filled with the plastic-bonded magnetic material.

With the design examples under consideration, the basic bodies 4, 5 and/or 6 are single-pieced punching-bending parts manufactured from an appropriate metal material.

REFERENCE LIST

1 Permanent magnet
2 Permanent magnet
3 Permanent magnet
4 Basic body
5 Basic body
6 Basic body
7 Strap-shaped part
8 Strap-shaped part
9 Strap-shaped part
10 Bush-shaped part
11 Flange part
12 Flange part
13 Flange part
14 Ring-shaped area
15 Opening
16 Recess

What is claimed is:

1. High-grade plastic product comprising:

a high-grade plastic component formed of a plastic material and having a particulate material embedded in said plastic material;

a basic body having a positive connection to said high-grade plastic component and including at least one strap-shaped part embedded in said plastic material, wherein said plastic material contracts physically when changing from a fluid state to a solid state, and wherein the positive connection between said basic body and said high-grade plastic component includes said solid plastic material exerting a contracting strain on said at least one strap-shaped part by virtue of said at least one strap-shaped part being embedded in said plastic material while in said fluid state thereof.

2. High-grade plastic product according to claim 1, wherein said high-grade plastic component is in the shape of a ring or disc, and the basic body has a longitudinal axis and comprises (i) a bush-shaped part, and (ii) a flange part extending laterally of the bush-shaped part, and said at least one strap-shaped part is arranged at the flange part and is inclined towards the longitudinal axis of the basic body.

3. High-grade plastic product according to claim 2, comprising a plurality of said strap-shaped parts distributed along a circumference of the flange part.

4. High-grade plastic product according to claim 3, wherein the flange part is in adjoining relationship to the bush-shaped part;

the flange part includes a ring which is oriented generally radially with respect to the longitudinal axis of the basic body, the ring being provided with openings each having inside and outside radial edges, the strap-shaped parts being arranged at the inside and outside radial edges of said openings, and the opening being filled with the plastic material containing the particulate material embedded therein.

5. High-grade plastic product according to claim 3, wherein the flange part is in adjoining relationship to the bush-shaped part;

the flange part includes a ring which is oriented generally radially with respect to the longitudinal axis of the basic body, and the strap-shaped parts are distributed along the circumference of the flange part.

6. High-grade plastic product according to claim 4, wherein the high-grade plastic component is located at a front portion of the ring of the flange part, and the strap-shaped part project from the flange part and are inclined towards the longitudinal axis of the basic body.

7. High-grade plastic product according to claim 1, wherein the basic body is made of metal.

8. High-grade plastic product according to claim 1, wherein the basic body is made of plastic.

9. High-grade plastic product according to claim 1, wherein the high-grade plastic component is a plastic-filled permanent magnet.

10. High-grade plastic product according to claim 1, wherein the high-grade plastic component is a plastic-bonded magnet.

* * * * *